United States Patent
Okada et al.

(10) Patent No.: US 7,511,394 B2
(45) Date of Patent: Mar. 31, 2009

(54) ROTATIONAL ELECTRIC MACHINE STATOR AND MANUFACTURING METHOD THEREFOR

(75) Inventors: Tomoyuki Okada, Shioya-gun (JP); Shoei Abe, Kawachi-gun (JP); Tatsuro Horie, Utsunomiya (JP); Hiromitsu Sato, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 11/474,444

(22) Filed: Jun. 26, 2006

(65) Prior Publication Data
US 2007/0001526 A1   Jan. 4, 2007

(30) Foreign Application Priority Data
Jun. 30, 2005   (JP) ............................. 2005-191556

(51) Int. Cl.
    *H02K 11/00* (2006.01)
(52) U.S. Cl. ..................... 310/71; 310/194; 310/254
(58) Field of Classification Search ............... 310/49 R, 310/71, 194, 254, 258–259
    See application file for complete search history.

(56) References Cited

U.S. PATENT DOCUMENTS

| | | | | |
|---|---|---|---|---|
| 4,779,330 A | * | 10/1988 | Genco et al. ................... | 29/596 |
| 5,173,628 A | * | 12/1992 | Yoshida et al. ................. | 310/71 |
| 5,983,484 A | * | 11/1999 | Harada et al. .................. | 29/596 |
| 6,031,444 A | * | 2/2000 | Agata et al. ................... | 336/192 |
| 6,102,728 A | | 8/2000 | Shinchi | |
| 6,873,074 B2 | * | 3/2005 | Mimura ........................ | 310/71 |
| 6,949,848 B2 | * | 9/2005 | Yamada et al. ................. | 310/71 |
| 7,026,739 B2 | | 4/2006 | Okada et al. | |
| 7,034,419 B2 | * | 4/2006 | Kabasawa et al. ............. | 310/71 |
| 2004/0070293 A1 | * | 4/2004 | Kabasawa et al. ............. | 310/71 |
| 2004/0232785 A1 | * | 11/2004 | Yamada et al. ................. | 310/71 |

FOREIGN PATENT DOCUMENTS

| | | |
|---|---|---|
| CN | 1075254 C | 11/2001 |
| CN | 1550058 A | 11/2004 |
| JP | 3346297 B2 | 11/2002 |
| JP | 2003-79079 | 3/2003 |
| JP | 2003-79079 A | 3/2003 |
| JP | 2005-51999 A | 2/2005 |

OTHER PUBLICATIONS

Chinese Office Action dated Dec. 28, 2007, U.S. Appl. No. 200610093017.1.

* cited by examiner

*Primary Examiner*—Thanh Lam
(74) *Attorney, Agent, or Firm*—Westerman, Hattori, Daniels & Adrian, LLP.

(57) ABSTRACT

A rotational electric machine stator has a rectangular wire that includes a lead wire covered with an insulation coating, terminals that is connected to the rectangular wire by thermal fusing, and convex portions provided on the terminals so as to protrude from the terminals toward the rectangular wire, wherein the insulation coating is removed.

7 Claims, 5 Drawing Sheets

ROTATIONAL ELECTRIC MACHINE STATOR AND MANUFACTURING METHOD THEREFOR

BACKGROUND OF THE INVENTION

1. Field of the Invention

The present invention relates to a stator used in a rotational electric machine such as an electrical motor or a generator, and a manufacturing method therefor.

Priority is claimed on Japanese Patent Application No. 2005-191556, filed Jun. 30, 2005, the contents of which are incorporated herein by reference.

2. Description of the Related Art

There is conventionally known a three-phase motor that drives a rotor in three phases by means of a stator in which three stator windings of a U-phase, a V-phase, and a W-phase are concentrically wound on stator cores for each of the three phases.

In order to prevent the flow of excess current in such windings, the windings are covered with an insulation coating. In this case, there is known thermal fusing technology for having the end of a coil winding conduct electricity with a fusing terminal member.

There are windings of a stator so-called round wire with a circular cross section and so-called rectangular wire with a rectangular cross section. Japanese Patent Granted Publication No. 3346297 discloses thermal fusing of rectangular wire, while Japanese Unexamined Patent Application, First Publication No. 2003-79079 and Japanese Unexamined Patent Application, First Publication No. 2005-51999 disclose thermal fusing of round wire.

When a round wire 51 that includes a lead wire 55 covered by an insulation coating 54 is fixed to a terminal 52, first the round wire 51 is inserted into the terminal 52 as shown in FIG. 8, with the terminal 52 then crimped in the state of a pair of electrodes 53 brought into contact from the outer sides of the terminal 52. Thereby, as shown in FIG. 9, the round wire 51 inserted into the terminal 52 is flattened, and the insulation coating 54 on the surface of the round wire 51 is pushed outward of the contact portions with the terminal 52. Then, when the terminal 52 is fused by passing electrical current between the pair of electrodes 53, the portion of the insulation coating 54 in contact with the terminal 52 is melted by the generated heat from the current to flow outward of the contact portions.

Thereby, the exposed lead wire 55 is welded to the terminal 52, so that the electrical contact between the round wire 51 and the terminal 52 is ensured.

However, in the case of thermal fusing being performed on a rectangular wire, the following problems arise when using conventional technology. Namely, when the rectangular wire 56 is inserted into the terminal 52 and the terminal 52 is crimped as shown in FIG. 10, the insulation coating 54 of the pressed rectangular wire 56 becomes sandwiched between the inner surfaces of the terminal 52. As a result, even if thermal fusing is performed on the terminal 52 by passing a current between the pair of electrodes 53, the insulation coating 54 that is sandwiched in the terminal 52 does not fuse, and so ends up remaining behind as residual coating 57. When this residual coating 57 is generated, there is the risk it may cause an increase in contact resistance and a decrease in the conductive performance.

SUMMARY OF THE INVENTION

The present invention has as its object to provide a rotational electric machine stator and a manufacturing method therefor that can perform good electrical connection processing between a rectangular wire wound on a stator and a terminal and also ensure conductive performance.

The rotational electric machine stator according to a first aspect of the present invention is a rotational electric machine stator having: a rectangular wire that includes a lead wire covered with an insulation coating; a terminal that is connected to the rectangular wire by thermal fusing; and convex portions provided on the terminal so as to protrude from the terminal toward the rectangular wire; wherein the insulation coating is removed.

In this stator, the convex portions formed in the interior portion of the terminal are made to be in firm contact with the rectangular wire. Thereby, force is concentrated on the region of the rectangular wire that is in firm contact with the convex portions, so that the insulation coating that covers the regions of the rectangular wire in firm contact with the convex portions is biased in outward directions of the convex portions (i.e., directions away from the convex portions). When electric current is passed through the terminal, the insulation coating is melted by heat that is generated, and thereby shifts outward of the convex portions. Therefore, the insulation coating is prevented from remaining at the locations (between the terminal and the lead wire) in contact with the terminal. Thereby, the exposed lead wire can be welded to the terminal, and the electrical connection with the terminal can be ensured. In addition, by using a rectangular wire, since the contact region with the terminal, i.e., the conducting region, is larger compared to a round wire with the same cross-sectional area, high conductive performance can be ensured.

In the stator, a pair of the convex portions are preferably provided at positions to sandwich both sides of the rectangular wire therebetween.

In this case, the insulation coating in close contact with the pair of convex portions is melted by the thermal fusing and shifts in the biased direction. As a result, the insulation coating is reliably prevented from remaining behind at the regions of the rectangular wire in contact with the terminal.

Also, since force can be concentrated on the rectangular wire by the pair of convex portions from both sides of the terminal, the thermal fusing process can be more quickly performed.

The stator is preferably provided with an insulating member wound with the rectangular wire and a connection member that has a plurality of the terminals, with a housing portion that houses the connection member being integrally provided on the insulating member. It is preferable that at the insulating member be provided with projections that make contact with the rectangular wire near the housing portion.

In this case, the process of individually attaching a plurality of terminals to the insulating member can be eliminated, thereby reducing the number of components. Also, heat can be dissipated from the rectangular wire and the terminals to the outside by way of the projections. Accordingly, the influence of thermal fusing on the insulation coating outside the region that is welded to the terminal can be suppressed. Therefore, damage to the insulation coating can be prevented, and both ensuring the conductive performance between the terminal and the rectangular wire and preventing the flow of excess current (short-circuiting between lead wires due to damage to the insulation coating) can be readily achieved.

In this stator, it is preferable that the terminals and the projections be molded in resin. Moreover, it is preferable that a partition wall that dams the resin be further provided at a position on the inner circumference side of the projections when viewing the stator along the axis thereof.

In this case, by filling resin into the inside region of the housing portion, the heat dissipation performance can be further increased. By the partition wall, resin can be molded only at the region that requires heat dissipation due to thermal fusing, thereby suppressing an increase in weight due to excess resin.

The rotational electric machine stator according to a second aspect of the present invention has: a stator core that has a plurality of magnetic teeth disposed at a specified interval in the circumferential direction and protruding in the radial direction; a plurality of coils in which rectangular wire including a lead wire covered with an insulation coating and having a first end portion and a second end portion is wound on the magnetic teeth via insulating members; a first connection member that has a first terminal having first convex portions connected to the first end portion of the rectangular wire by thermal fusing; and a second connection member made of an electrically conductive material that has a second terminal having second convex portions connected to the second end portion of the rectangular wire by thermal fusing, and a neutral point terminal having third convex portions connected to a neutral point end portion of the rectangular wire of another adjacent coil by thermal fusing.

In this stator, the convex portions formed in the interior portion of each terminal are made to be in firm contact with the rectangular wire. Thereby, force is concentrated on the regions of the rectangular wire that are in firm contact with the convex portions, so that the insulation coating that covers the region in firm contact with the convex portions is biased in outward directions of the convex portions (i.e., directions away from the convex portions). When electric current is passed through each terminal, the insulation coating is melted by heat that is generated, and thereby shifts outward of the convex portions. This can prevent the insulation coating from remaining at the locations (between the terminal and the lead wire) in contact with the terminal. Thereby, the exposed lead wire can be welded to the terminal, and the electrical connection with the terminal can be ensured. In addition, by using a rectangular wire, since the contact region with the terminal, i.e., the conducting region, is larger compared to a round wire with the same cross-sectional area, high conductive performance can be ensured.

A third aspect of the present invention is a manufacturing method of a rotational electric machine stator provided with a rectangular wire that is covered with an insulation coating and a terminal that is connected to the rectangular wire by thermal fusing, having: a rectangular wire placement step that places the rectangular wire in a position corresponding to convex portions provided in the terminal; and a thermal fusing step that performs thermal fusing to connect the terminal and the rectangular wire in the state of the convex portions being in firm contact with the rectangular wire, and removes the insulation coating at the connection location.

According to this manufacturing method, the rectangular wire is disposed so that the convex portions formed in the interior portion of the terminal are made to be in firm contact with the rectangular wire. Thereby, force is concentrated on the region of the rectangular wire that is in firm contact with the convex portion, so that the insulation coating that covers the region of the rectangular wire in firm contact with the convex portions is biased in outward directions of the convex portions (i.e., directions away from the convex portions). When electric current is passed through the terminal, the locations of the insulation coating in contact with the terminal are melted by heat that is generated from the passing current. At this time, the melted insulation coating shifts in the biased directions (i.e., directions away from the convex portion). This can prevent the insulation coating from remaining at the locations (between the terminal and the lead wire) in contact with the terminal. Thereby, the exposed lead wire can be welded to the terminal, and the electrical connection with the terminal can be ensured. In addition, by using a rectangular wire, since the contact region with the terminal, i.e., the conducting region, is larger compared to a round wire with the same cross-sectional area, high conductive performance can be ensured. Moreover, since the electric current is electrically guided to flow to the region of the rectangular wire that is in firm contact with the convex portions where force is concentrated, and the region of the lead wire in firm contact with the convex portions is directly heated by the heat generated from the passing current, the thermal fusing process can be quickly performed.

In the thermal fusing step, it is preferable that the thermal fusing be performed until the convex portions are flattened. Also, it is preferable that the terminal have an opening for sandwiching the rectangular wire, and the convex portions be formed at positions corresponding to the rectangular wire when the rectangular wire is inserted in the opening, with the rectangular wire being inserted in the opening in the rectangular wire placement step.

In this case, the rectangular wire can be readily inserted from the opening of the terminal. Since a pair of convex portions are formed in the middle portions of the inner surface of the terminal, the rectangular wire can be easily positioned and retained at the convex portions of the terminal. By deforming the pair of convex portions to be flat by thermal fusing, the insulation coating covering the regions in contact with the pair of convex portions can be naturally shifted in the outward directions of the convex portions. Accordingly, the insulation coating can be removed at the regions in contact with the terminal while suppressing the application of a load to the rectangular wire.

The stator of the present invention can ensure the electrical connection between a terminal and the rectangular wire. By using a rectangular wire, high conductive performance can be ensured.

The stator of the present invention can reliably prevent the insulation coating from remaining at the regions in contact with the terminal. The thermal fusing process can therefore be more quickly performed.

The stator of the present invention can eliminate the process of individually attaching a plurality of terminals to the insulating member, thereby reducing the number of components. Both ensuring the conductive performance between the terminals and the rectangular wire and preventing the flow of excess current can therefore be achieved.

The stator of the present invention can further increase the heat dissipation performance. Thereby, an increase in weight due to excess resin can be suppressed.

The stator of the present invention can ensure the electrical connection between the terminals and the rectangular wire. By using a rectangular wire, high conductive performance can be ensured.

The manufacturing method of the present invention can ensure the electrical connection between a terminal and the rectangular wire. By using a rectangular wire, high conductive performance can be ensured. The thermal fusing process can therefore be more quickly performed.

The manufacturing method of the present invention can readily perform insertion of the rectangular wire into the terminal. The rectangular wire can be readily positioned and retained at the convex portions of the terminal. Accordingly, the insulation coating can be removed at the regions in contact with the terminal while suppressing the application of a load to the rectangular wire.

DETAILED DESCRIPTION OF THE INVENTION

A rotational electric machine stator and a manufacturing method therefor according to embodiments of the present invention shall be explained below, with reference to the accompanying drawings.

Figure 1:
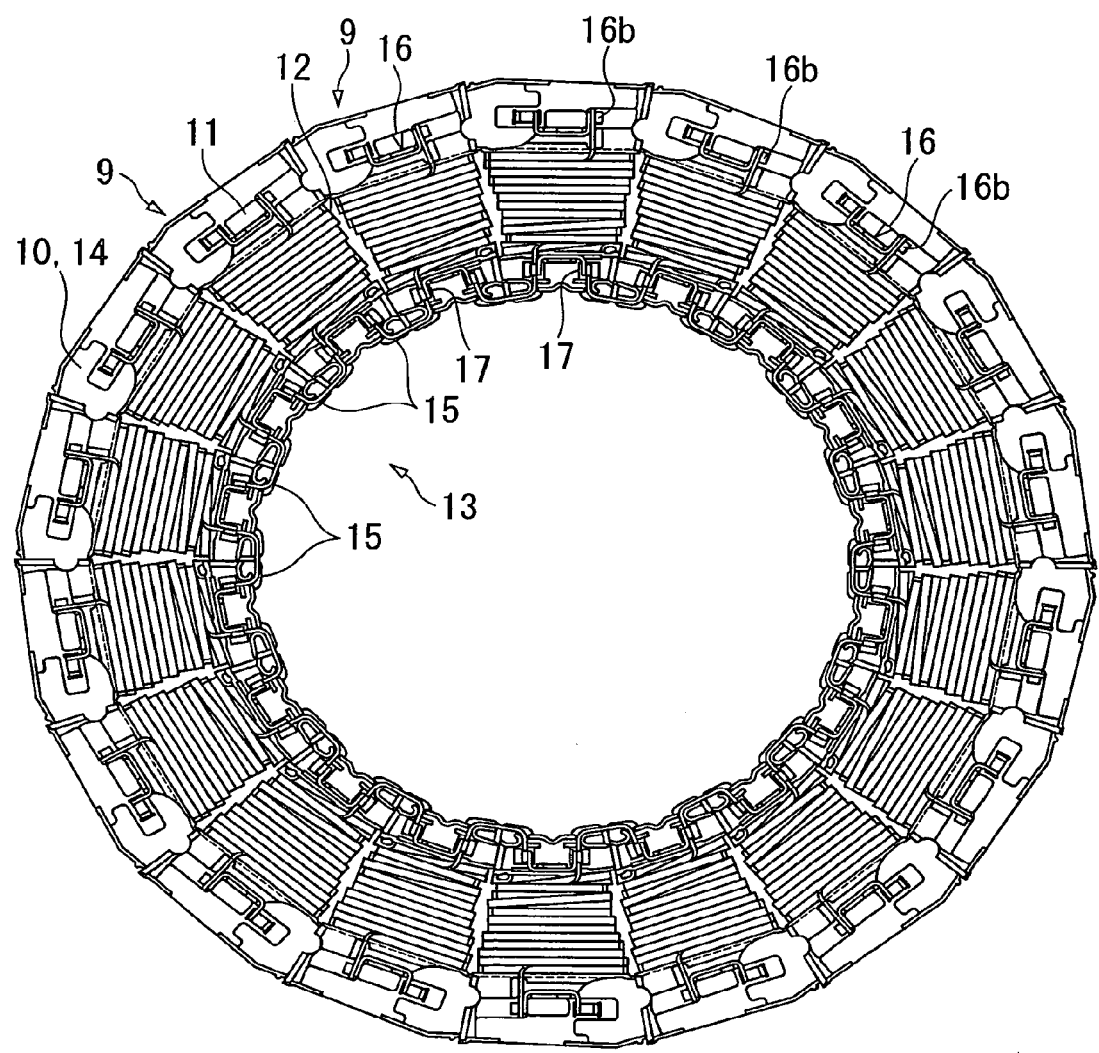
FIG. 1 is a front view showing a rotational electric machine stator in an embodiment of the present invention.

FIG. 1 is a front view showing a stator 6 for a rotational electric machine in one embodiment of the present invention. The stator 6 according to the present embodiment is constituted by a plurality of stator units 9 that are arranged in a circle. Each stator unit 9 includes a core unit 10, an insulating member 11, and a coil 12. The core unit 10 is constituted by a stacked iron core in which is stacked in an axial direction of the stator 6 T-shaped magnetic steel plates 14 having a back yoke and magnetic pole teeth 15 protruding from the back yoke toward the inner circumference side of the stator 6. By arranging a plurality of the core units 10 in the circumferential direction, a circular stator core 13 is constituted. The insulating member 11 is a member that electrically insulates the coil 12 and the stacked iron core (magnetic steel plates 14). The insulating member 11 is disposed on at least one end surface of the magnetic steel plates 14, and is formed from an electrically insulating material with good thermal conductivity (such as polyphenylene sulfide (PPS) resin). Below, "circumferential direction," "radial direction," and "axial direction" refer to the circumferential direction, radial direction, and axial direction, respectively, of the stator 6 unless otherwise specified.

The coil 12 is constituted by winding a rectangular wire 22, which includes a lead wire 27 covered with an insulation coating 20, on the magnetic pole teeth 15 of the core unit 10 via the insulating member 11.

Housing portions 28 are integrally formed at both ends of the coil 12 on the insulating member 11. One housing portion 28 houses a first connection member 16 at which a first end portion 12a of the rectangular wire 22 is connected, and the other housing portion 28 houses a second connection member 17 at which a second end portion 12b of the rectangular wire 22 is connected. The first connection member 16 and the second connection member 17 are fixed to the housing portions 28 by fixing pieces 16c and 17c, respectively.

The first connection member 16 has a current collection/distribution terminal 16a and a first terminal 16b that are formed in a fork shape for sandwiching an electrical conductor on the inside. The second connection member 17 has a second terminal 17a and a neutral-point terminal 17b that are formed in a fork shape for sandwiching an electrical conductor on the inside. The first end portion 12a (current collection/distribution portion) of the coil 12 (rectangular wire 22) is electrically connected to the first connection member 16 in the state of being housed in the first terminal 16b.

When a collection/distribution ring (not shown) is disposed near the periphery of the magnetic pole teeth 15, a terminal (not shown) extending inwardly in the radial direction from the inner circumference of the collection/distribution ring is housed in the collection/distribution terminal 16a of the first connection member 16.

Figure 2:
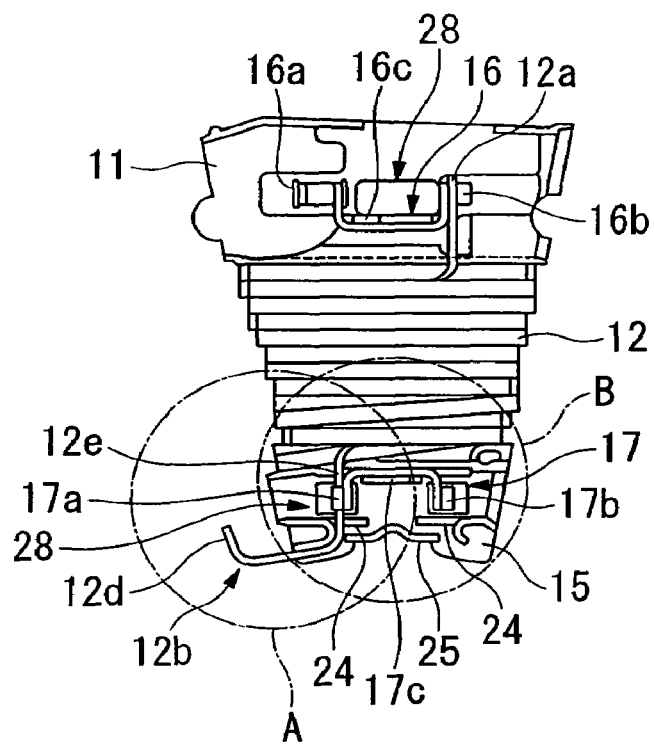
FIG. 2 is a front view showing a stator unit that constitutes the stator shown in FIG. 1.
Figure 3:
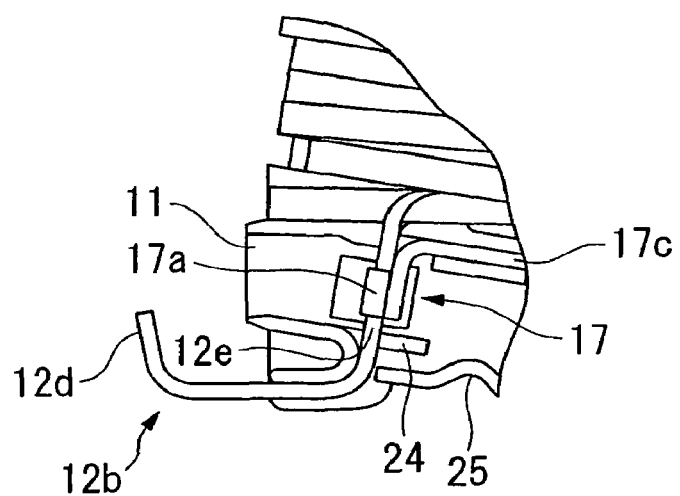
FIG. 3 is an enlarged view showing an encircled portion A of the stator unit shown in FIG. 2.

The second connection member 17 has a structure identical to the first connection member 16. As shown in FIGS. 2 and 3, the middle portion of the second end portion 12b is connected to the second terminal 17a of the second connection member 17. A distal end 12d of the second end portion 12b extends toward another adjacent coil 12.

Figure 4:
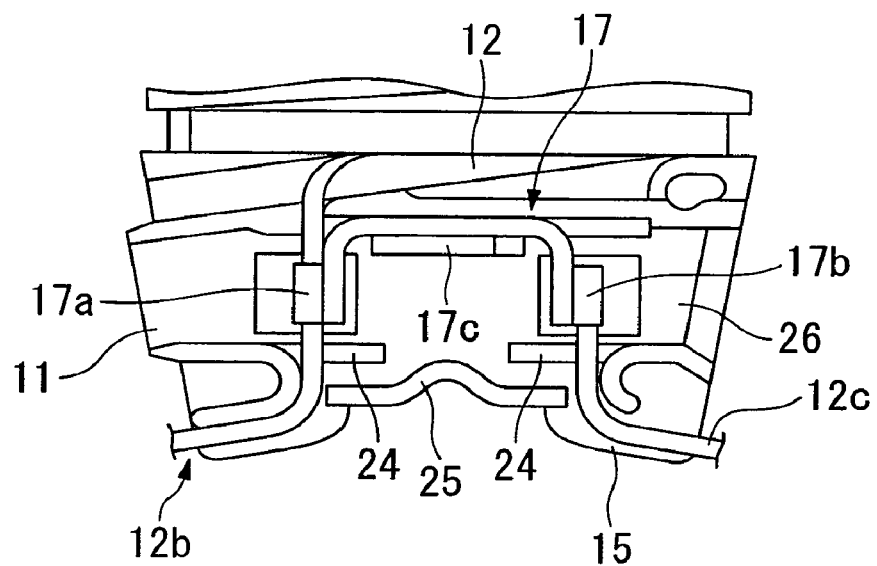
FIG. 4 is an enlarged view showing an encircled portion B of the stator unit shown in FIG. 2.

As shown in FIGS. 2 and 4, a lead wire 12c that extends from another adjacent coil 12 is connected to the neutral-point terminal 17b.

A pair of projections 24 are provided at the insulating member 11 on the inner circumference side of the second terminal 17a and the neutral-point terminal 17b. These projections 24 are formed in a rectangular shape extending in the circumferential direction. One end portion of each projection 24 is in contact with the second end portion 12b of the coil 12. A partition wall 25 is provided at the insulating member 11 on the inner circumference side of these projections 24. The partition wall 25 is formed in an umbrella-shape, with the middle portion thereof protruding toward the outer periphery and the both end portions thereof extending to positions near the second end portion 12b of the rectangular wire 22 and the lead wire 12c extending from the other adjacent coil 12, respectively. The region on the outer periphery side of the partition wall 25 (i.e., the region including the second terminal 17a, the neutral-point terminal 17b, and the projections 24) is a molded region 26 that is molded with resin (refer to FIG. 4).

By performing thermal fusing on the current collection/distribution terminal 16a, the first terminal 16b, the second terminal 17a, and the neutral-point terminal 17b, which all have the rectangular wire 22 disposed therein, the current collection/distribution terminal 16a, the first terminal 16b, the second terminal 17a, and the neutral-point terminal 17b are electrically connected to both end portions 12a and 12b of the coil 12. This is explained referring to FIGS. 5 to 7, using the second terminal 17a and the second end portion 12b of the coil 12 as an example.

Figure 5:
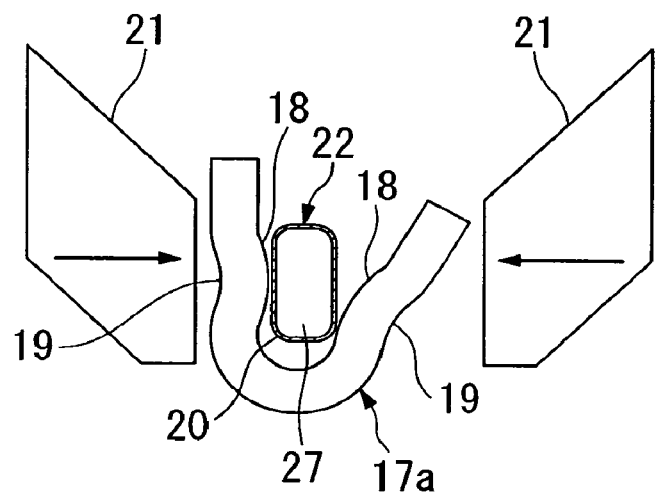
FIG. 5 is an explanatory view showing a thermal fusing step in the embodiment of the present invention.

As shown in FIG. 5, the second terminal 17a has an opening that is formed in a U-shape in a plan view. A pair of convex portions 18 that face each other are formed in the middle portions of the inner surface thereof. On the middle portions of the outer surface of the second terminal 17a, a concave portion 19 is formed at each location corresponding to the convex portions 18.

The coil 12 (rectangular wire 22) is inserted into the second terminal 17a thus constituted, and the outer sides of the second terminal 17a are pressed by a pair of electrodes 21.

Figure 6:
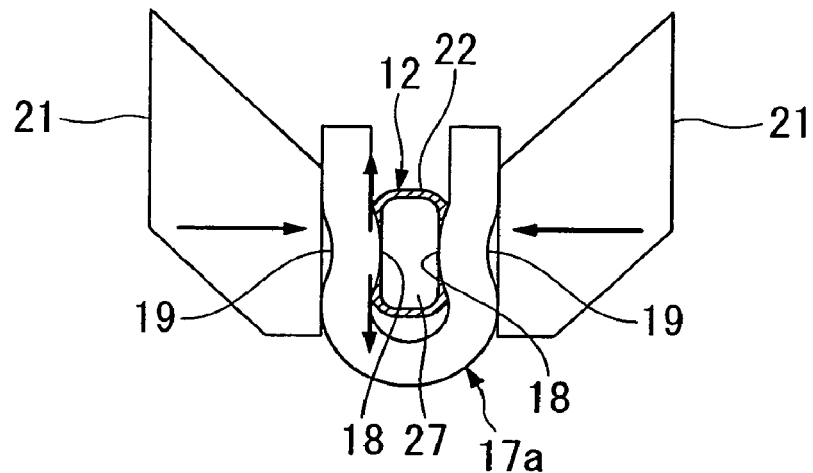
FIG. 6 is an explanatory view showing the thermal fusing step in the embodiment of the present invention.

As shown in FIG. 6, the U-shaped second terminal 17a deforms, the gap between the opposing inner surfaces narrows, and the convex portions 18 press against the rectangular wire 22. Thereby, the insulation coating 20 that covers the coil 12 is biased by the convex portions 18 in the outward directions of the convex portions 18.

Thermal fusing is performed by passing electric current from the electrodes 21 through the second terminal 17a. Thermal fusing of the second terminal 17a causes the insulation coating 20 that is in contact with the second terminal 17a to melt from the heat generated by the current passed therethrough. At this time, the melted insulation coating 20 shifts in the biased directions (directions away from the convex portions 18, indicated by arrows in FIG. 6). This can therefore prevent the insulation coating 20 from remaining behind on the rectangular wire 22 at portions in contact with the second terminal 17a. Moreover, since the electric current flows to a region of the rectangular wire 22 that is in firm contact with the convex portions 18 where force is concentrated, and the lead wire 27 is directly heated at the region where the insulation coating 20 is removed, the thermal fusing process can be quickly performed.

Figure 7:
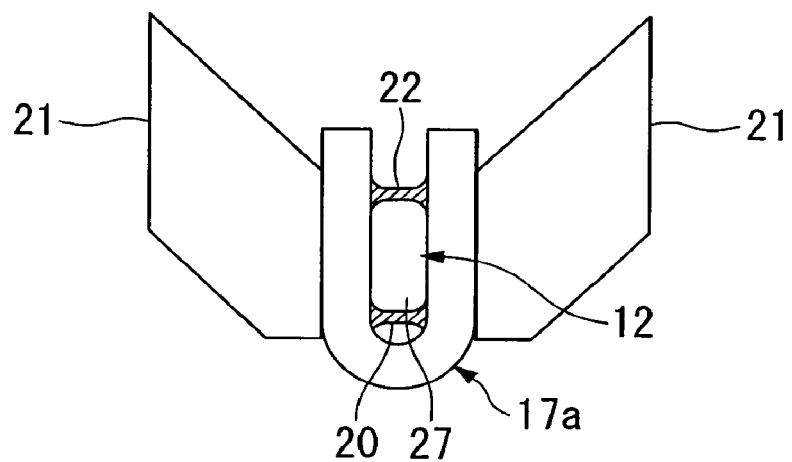
FIG. 7 is an explanatory view showing the thermal fusing step in the embodiment of the present invention.
Figure 8:
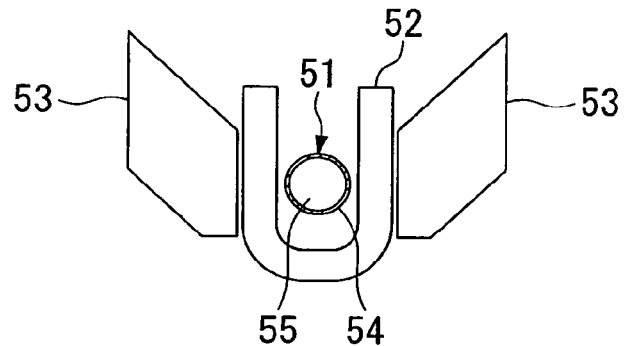
FIG. 8 is an explanatory view showing a thermal fusing step for a round wire in a conventional example.
Figure 9:
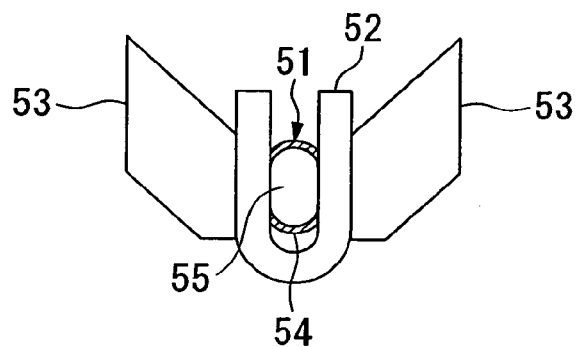
FIG. 9 is an explanatory view showing the thermal fusing step for a round wire in a conventional example.
Figure 10:
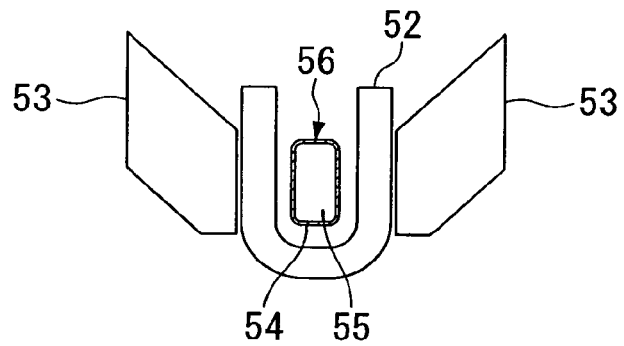
FIG. 10 is an explanatory view showing a thermal fusing step for a rectangular wire in a conventional example.
Figure 11:
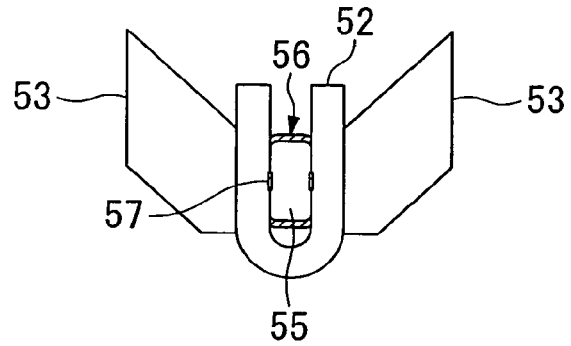
FIG. 11 is an explanatory drawing showing the thermal fusing step for a rectangular wire in a conventional example.

As shown in FIG. 7, the convex portions 18 are deformed to be flat by further pressing the second terminal 17a. In this way, by deforming the convex portions 18 to be flat, the insulation coating 20 of the rectangular wire 22 at the regions in contact with the convex portions 18 can be naturally shifted in the outward directions of the convex portions 18. Accordingly, the insulation coating 20 can be removed at the region in contact with the second terminal 17a while suppressing the application of a load to the coil 12 (flat coil 22).

After thermal fusing the second terminal 17a and the rectangular wire 22, the heat that remains at the rectangular wire 22 and the second terminal 17a can be dissipated to the outside through the projections 24. Thereby, the temperature of the second terminal 17a and the coil 12 (rectangular wire 22) after thermal fusing can be quickly returned to a normal temperature. Accordingly, the influence of the thermal fusing on the insulation coating 20 outside the region that is welded to the second terminal 17a can be suppressed. Also, both ensuring the conductive performance with the neutral-point terminal 17b and the coil 12 and preventing the flow of excess current can be readily achieved.

Therefore, by welding the exposed lead wire 27 to the second terminal 17a, the present embodiment can ensure electrical connection with the second terminal 17a. By using a rectangular wire, since the contact region with the second terminal 17a, i.e., the conducting region, is larger compared to a round wire with the same cross-sectional area, high conductive performance can be ensured.

By similarly performing thermal fusing to electrically connect the end portions of the rectangular wire 22 and the first terminal 16b, the second terminal 17a, and the neutral-point terminal 17b, the aforementioned results can be obtained.

By molding resin in the region 26 that includes the second terminal 17a, the neutral-point terminal 17b and the projections 24, the heat dissipation performance can be further increased. By using the partition wall 25 to partition the region molded with resin, resin can be molded only at the region that requires heat dissipation due to thermal fusing, thereby suppressing an increase in weight due to excess resin.

The content of the present invention is not limited to the foregoing embodiment.

As stated above, if the second connection member 17 provided with the second terminal 17a and the neutral-point terminal 17b is integrally formed, the process of individually attaching the second terminal 17a and the neutral-point terminal 17b to the insulating member 11 can be eliminated, which is preferable in terms of reducing the number of components. However, the present invention can be applied even in the case of individually attaching the second terminal 17a and the neutral-point terminal 17b. In addition, in the present embodiment, the convex portions 18 were transformed to be flat by applying pressure to the second terminal 17a, but the convex portions 18 may be allowed to remain.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rotational electric machine stator comprising:
   a rectangular wire that includes a lead wire covered with an insulation coating;
   a terminal that is connected to the rectangular wire by thermal fusing; and
   a convex portion provided on the terminal so as to protrude from the terminal toward the rectangular wire,
   wherein the insulation coating is removed.

2. A rotational electric machine stator according to claim 1, wherein a pair of the convex portions are provided at positions to sandwich both sides of the rectangular wire therebetween.

3. A rotational electric machine stator according to claim 1, further comprising:
   an insulating member that is wound with the rectangular wire; and
   a connection member that has a plurality of the terminals, wherein
   a housing portion that houses the connection member is integrally provided on the insulating member.

4. A rotational electric machine stator according to claim 3, wherein projections that contact with the rectangular wire near the housing portion are provided at the insulating member.

5. A rotational electric machine stator according to claim 4, wherein the terminals and the projections are molded in resin.

6. A rotational electric machine stator according to claim 5, further comprising a partition wall that dams the resin provided at a position on the inner circumference side of the projections when viewing the stator along an axis thereof.

7. A rotational electric machine stator comprising:
   a stator core that has a plurality of magnetic teeth disposed at a specified interval in the circumferential direction and protruding in the radial direction;
   a plurality of coils in which a rectangular wire including a lead wire covered with an insulation coating and having a first end portion and a second end portion is wound on the magnetic teeth via insulating members;
   a first connection member that has a first terminal having a first convex portion connected to the first end portion of the rectangular wire by thermal fusing; and
   a second connection member made of an electrically conductive material that has a second terminal having a second convex portion connected to the second end portion of the rectangular wire by thermal fusing, and a neutral point terminal having a third convex portion connected to a neutral point end portion of a rectangular wire of another adjacent coil by thermal fusing.

* * * * *